United States Patent [19]

Liang

[11] Patent Number: 4,760,456
[45] Date of Patent: Jul. 26, 1988

[54] CONDUCTIVE SCREEN FOR CATHODE RAY TUBES

[76] Inventor: Paul M. Liang, 4216 Hickory Rd., Apt. 3D, Mishawaka, Ind. 46545

[21] Appl. No.: 871,906

[22] Filed: Jun. 9, 1986

[51] Int. Cl.$^4$ ............................................ H04N 5/650
[52] U.S. Cl. .................................... 358/245; 358/247; 174/35 MS
[58] Field of Search ............................ 358/245, 247; 174/35 MS; 945/58

[56] References Cited

U.S. PATENT DOCUMENTS

| 2,977,412 | 3/1961 | Rhodes et al. | 358/252 |
| 4,381,421 | 4/1983 | Coats et al. | 358/245 |
| 4,468,702 | 8/1984 | Jandrell | 358/245 |
| 4,514,585 | 4/1985 | Paymton | 358/245 |

*Primary Examiner*—Edward L. Coles, Sr.
*Attorney, Agent, or Firm*—Thomas J. Dodd

[57] ABSTRACT

A conductive screen formed of a frame and a series of electrically conductive fibers. The screen is fitted over the display surface of a cathode ray tube (CRT) and connected to ground wire to diffuse emanated radiation and static electricity.

7 Claims, 3 Drawing Sheets

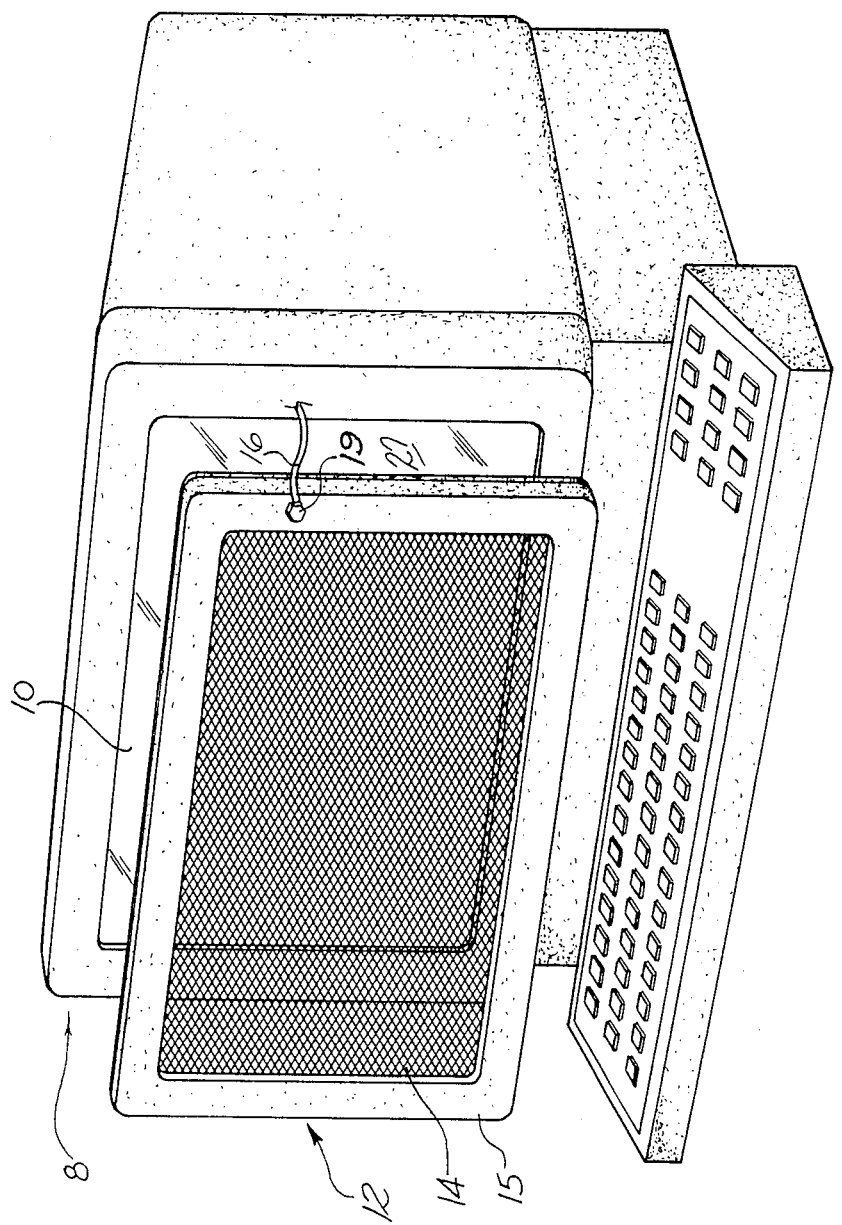

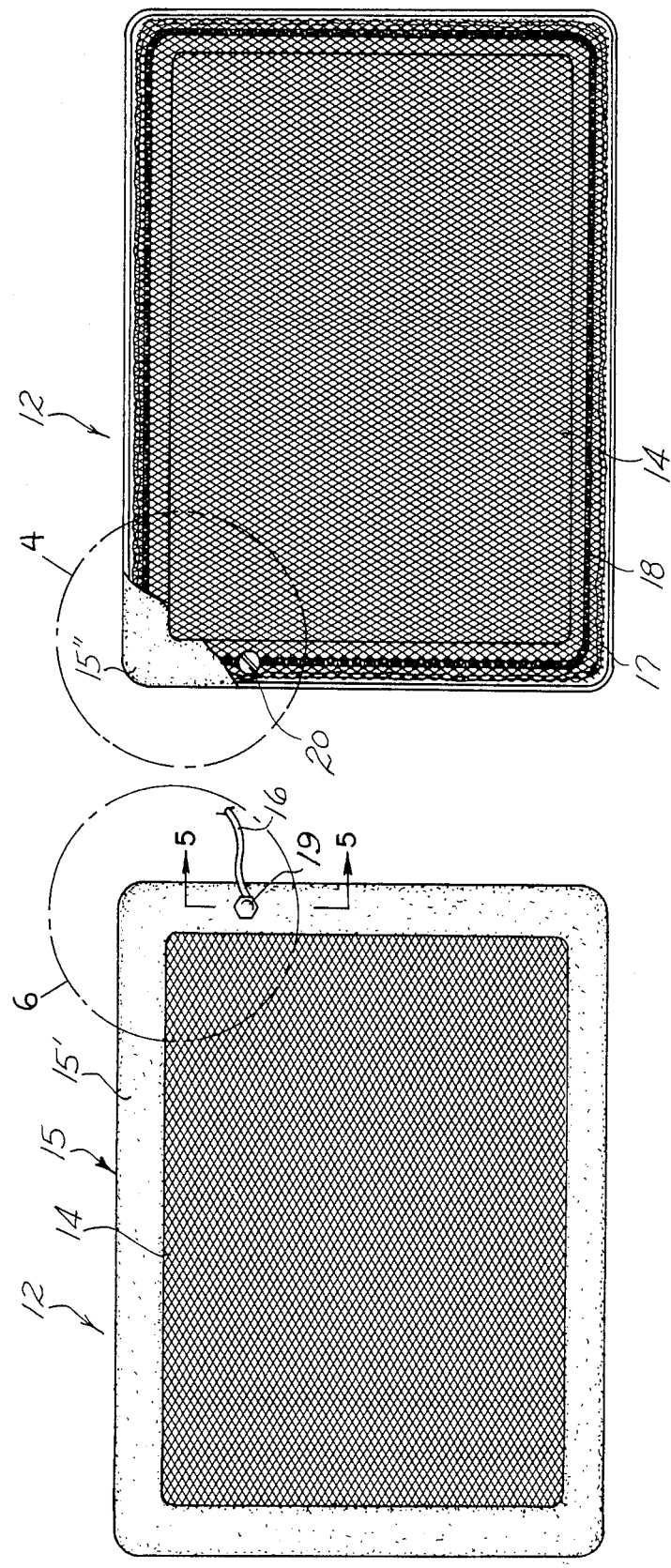

4,760,456

CONDUCTIVE SCREEN FOR CATHODE RAY TUBES

BACKGROUND OF THE INVENTION

This invention relates to a microwave screen and will have special application to a conductive screen which suppresses static electricity and electromagnetic radiation output of a video display terminal.

Recently, there has been a rapid increase in the use of video display terminals (VDT's) and the like. It has been shown that the surface of the cathode ray tube (CRT) in a VDT reflects glare from the surrounding environment which, in many instances, causes the user to experience eye fatigue and headache. A framed mesh screen of black filaments disclosed in U.S. Pat. No. 4,253,737 has been introduced to overcome the glare problem.

A potentially more serious problem with VDT's is their tendency to generate an electrostatic field adjacent to the CRT. This problem has recently been classified as a potential health hazard. In fact, many facial rash cases among VDT operators have been reported. This is attributable to the operator becoming electrically charged in the electrostatic field of the CRT so that dust and other pollutants, such as bacteria or other irritants, of opposite charge are attracted to the operator. The dust carrying opposite charge may also be attracted to the surface of the CRT and pollute the VDT screen as a result of the induced static charge.

The risk of nonionizing radiation in VDT screens has been debated for several years. It was reported that current levels of electromagnetic radiation which emanate from the CRT are well below the level at which the operator may become injured. However, such radiation does exist and older VDT's and those in a worsened condition most likely will produce radiation at levels which exceed the FDA standard allowed for television sets. At present, low frequency radiation is eliminated by a stainless steel (or other metal) mesh screen sandwiched between two rigid panels placed in front of the VDT screen. Due to the space between the screens and the display tubes, such devices produce Newton rings and Morie distortions. Mesh screens designed to eliminate such distortions are shown in U.S. Pat. Nos. 4,253,737 and 4,468,702.

As disclosed above, the screen of U.S. Pat. No. 4,253,737 was introduced to overcome the glare problems. The nylon screen disclosed in U.S. Pat. No. 4,468,702 is formed of a plurality of nylon yarns, some of which are electrically conductive. However, the method of making this screen is quite complicated and produces screen where only a fraction of the warp and weft fibers of the screen are electrically conductive.

SUMMARY OF THE INVENTION

The electrically conductive screen of this invention is formed by treating fibers, such as nylon or polyester, in a bath which contains copper (II) sulfide and an acid. Carbon black powder may also be added to the bath. As a result, all of the interwoven yarns of the screen are rendered conductive. The screen is then mounted in a flexible frame. A ground wire is attached to the frame prior to attaching the screen to the front surface of a VDT. By forming the screen of a series of conductive yarns, the emanation of electromagnetic radiation and static electricity from the VDT is significantly reduced.

Accordingly, it is an object of this invention to provide an improved screen which is for a video display terminal.

Another object of this invention is to provide for a VDT screen in which substantially all of the screen yarns are electrically conductive.

Another object of this invention is to provide for a VDT screen which reduces glare and effectively suppresses emanation of electromagnetic radiation and static electricity about the surface of a cathode ray tube.

Another object of this invention is to provide for a VDT screen which is simple and economical to produce.

Other objects of this invention will become apparent in a reading of the following description.

BRIEF DESCRIPTION OF THE DRAWINGS

A preferred embodiment of the invention has been depicted for illustrative purposes wherein:

FIG. 1 is a perspective view of a VDT showing the screen of this invention in use.

FIG. 2 is a front elevational view of the screen.

FIG. 3 is a rear elevational view of the screen.

DESCRIPTION OF THE PREFERRED EMBODIMENT

Figure 6:
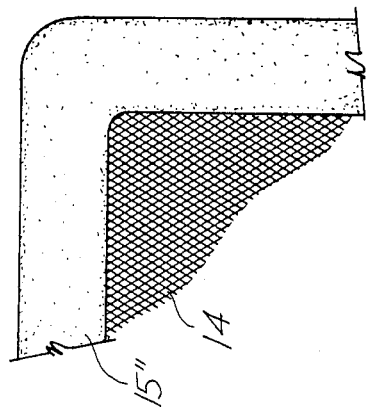
FIG. 6 is a fragmentary elevational view of the rear portion of the screen shown in broken line 6 of FIG. 2.

The preferred embodiment herein described is not intended to be exhaustive or to limit the invention to the precise form disclosed. It is chosen and described to explain the principles of the invention and its application and practical use to enable others skilled in the art to utilize the invention.

Referring to the drawings, FIG. 1 depicts a static electricity and radiation elimination member 12 incorporated in a video display terminal (VDT) 8 which has a cathode ray tube (CRT) 10. Member 12 includes an electrically conductive screen 14 secured to a flexible frame 15 by conductive polymeric strip 18 (FIG. 4), and an adhesive strip 17. A ground wire 16 extends from inside CRT 10 and is attached to frame 15 by a nut 19 and bolt 20 combination.

Figure 5:
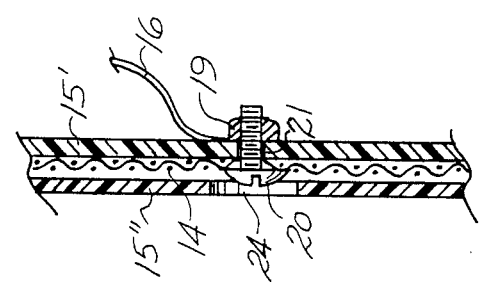
FIG. 5 is a fragmentary sectional view taken along line 5—5 of FIG. 2.

Frame 15 includes a front frame part 15' and a rear frame part 15" as shown in FIG. 5. Frame parts 15' and 15" are joined at their end edges 9 to form frame 15. Screen 15 is formed of fibers which range from 0.002 inches to 0.0028 inches in diameter and a mesh count of 109 to 200 filaments per inch to provide mesh openings of 0.003 to 0.006 inches. As indicated in U.S. Pat. No. 4,253,737, incorporated herein by reference, screen 14 is mounted in frame 15 and maintains contact over the display surface 27 of the CRT 10 to eliminate the distortions in Newton rings and Morie patterns.

Screen 14 is formed by treating fine mesh fabric, preferably nylon or polyester, in a heated bath which contains copper (II) sulfide and an acid. Carbon black powder may be added to the bath as a catalyst. The copper sulfide is adsorbed onto the fibers to render screen 14 highly conductive, which allows the screen to function as a static electricity and radiation elimination device. Also, the screen 14 may be dyed with an anti-reflective color such as dark grey or black to reduce glare. The method of forming screen 14 is described in detail in U.S. Pat. No. 4,661,376, issued Apr. 28, 1987, which is incorporated herein by reference.

Figure 4:
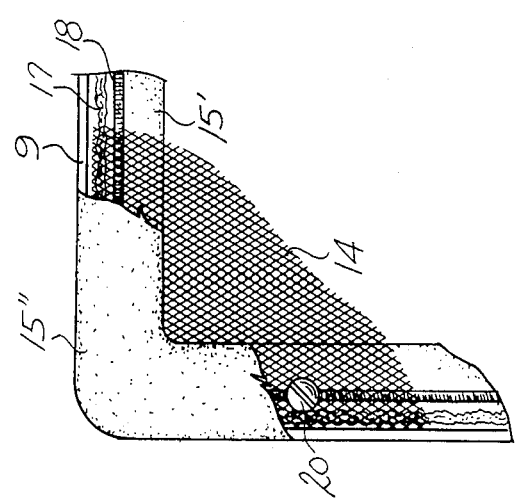
FIG. 4 is a fragmentary detail view of the rear portion of the screen shown in broken line 4 of FIG. 3.

After screen 14 has been thus formed, it is fitted into frame part 15' and secured by adhesive 17 as shown in FIG. 4. Bolt 20 is then passed through a bore 21 in frame part 15' and secured to frame part 15' in contact with screen 14 by nut 19. Frame part 15" is then secured to frame part 15' as above noted. A depression 24 in frame part 15" (FIG. 5) accommodates screw 20. This connection allows a continuous current flow between ground wire 16 and screen 14 whereby static electricity and radiation are effectively diffused.

It is understood that the above description does not limit the invention to the details above given but may be modified within the scope of the appended claims.

I claim:

1. An electrically conductive radiation elimination device adapted for use with a cathode ray tube, said device comprising a frame, a screen formed entirely of non-metallic fibers chemically treated with a metallic compound wherein the fibers are rendered electrically conductive, said screen fitted in said frame.

2. The radiation elimination device of claim 1 wherein said frame includes first and second joined frame parts, means securing said screen between said frame parts.

3. The radiation device of claim 2 wherein said securing means includes an electrically conductive strip affixed to said frame, an electrically conductive bolt extending through said first frame part and contacting said screen, said bolt constituting means for electrically connecting said device to a ground wire.

4. The device of claim 1 wherein said fibers are polyester mesh fabric coated with copper (II) sulfide.

5. In combination, a video display terminal including a cathode ray tube and a ground wire, and a radiation elimination device positioned between said cathode ray tube and a user, said radiation elimination device comprising a frame, a screen formed entirely of non-metallic fibers which have been chemically treated with a metallic compound to render said fibers electrically conductive, said screen secured in said frame, means for connecting said screen to said ground wire for diffusing static electricity and electromagnetic radiation emanating from said cathode ray tube.

6. The combination of claim 5 wherein said frame includes first and second joined frame parts, means securing said screen between said frame parts.

7. The combination of claim 6 wherein said securing means includes an electrically conductive strip affixed to said frame, an electrically conductive bolt extending through said first frame part and contacting said screen, said bolt constituting means for electrically connecting said device to a ground wire.

* * * * *